F. M. STOLL.
PORTABLE FOLDING BED.
APPLICATION FILED JULY 22, 1921.
1,422,320. Patented July 11, 1922.
2 SHEETS—SHEET 1.
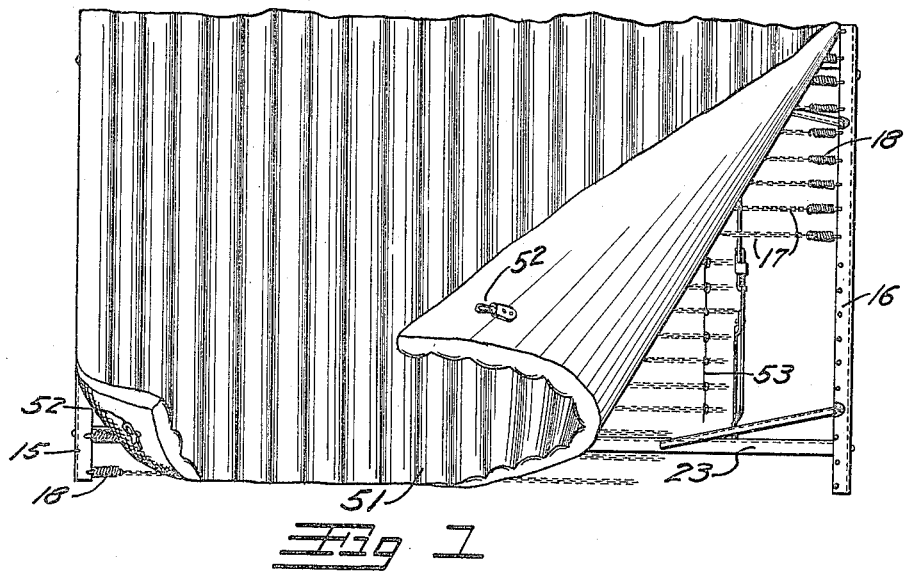
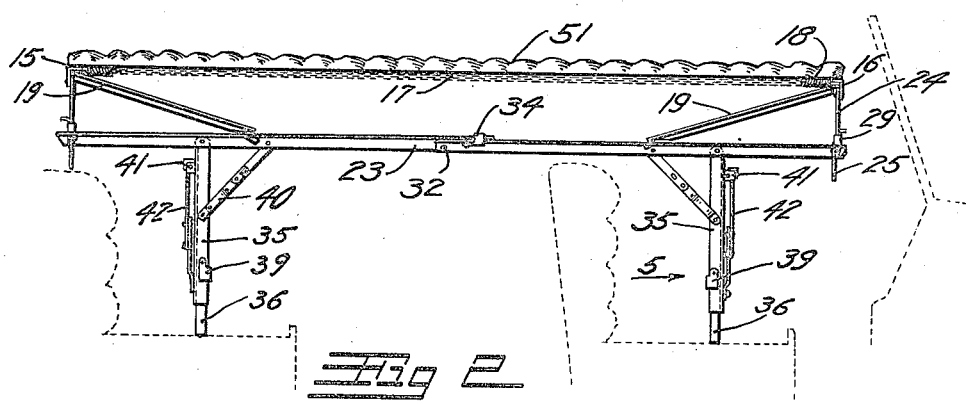
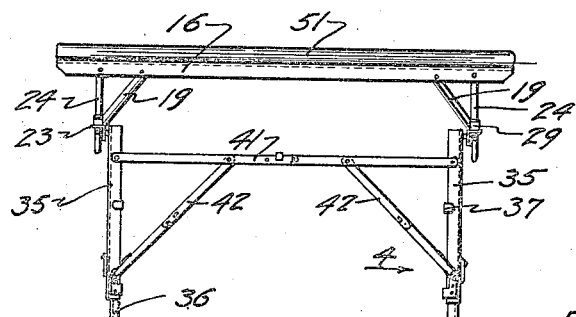
INVENTOR.
FRANK M. STOLL
BY
ATTORNEY.

F. M. STOLL.
PORTABLE FOLDING BED.
APPLICATION FILED JULY 22, 1921.
1,422,320.
Patented July 11, 1922.
2 SHEETS—SHEET 2.
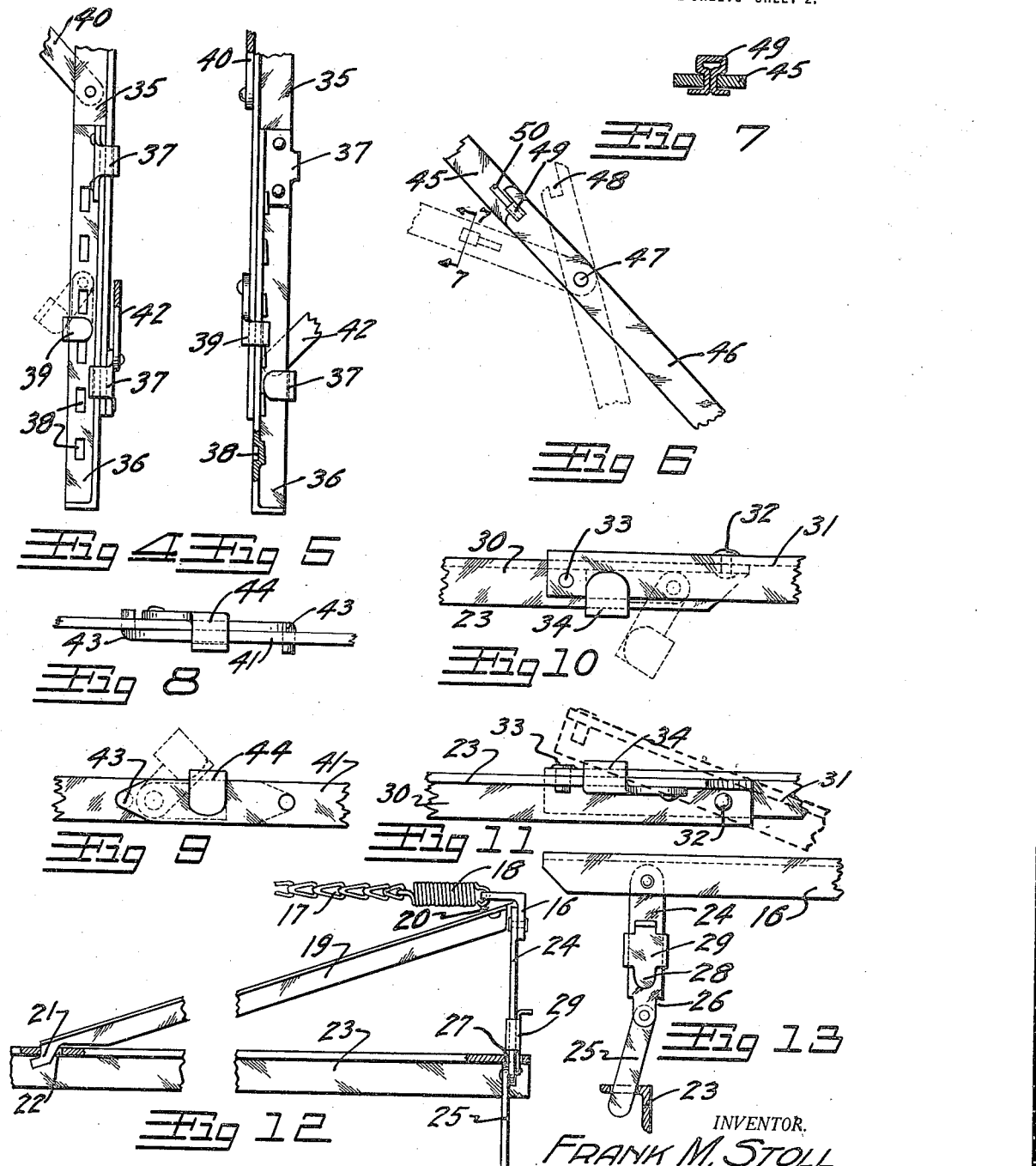
INVENTOR.
FRANK M. STOLL
BY
ATTORNEY.

UNITED STATES PATENT OFFICE.

FRANK M. STOLL, OF DENVER, COLORADO.

PORTABLE FOLDING BED.

1,422,320.      Specification of Letters Patent.      Patented July 11, 1922.

Application filed July 22, 1921. Serial No. 486,788.

*To all whom it may concern:*

Be it known that I, FRANK M. STOLL, a citizen of the United States, and a resident of Denver, in the county of Denver and State of Colorado, have invented certain new and useful Improvements in Portable Folding Beds, of which I do declare the following to be a full, clear, and exact description of the same, such as will enable others skilled in the art to which it appertains to make and use my invention, reference being had to the accompanying drawings, and to the reference numerals marked thereon, which form a part of this specification.

The invention relates to improvements in collapsible beds, and has for its principal object the provision of a bed of this character which may be quickly and conveniently collapsed or folded into a relatively small and compact bundle.

Another object of the invention is to provide a collapsible bed which may be used in connection with an automobile, its shape when folded, adapting it to be conveniently carried on the running board thereof and when extended to support itself within the automobile and over the seats thereof, the legs being adjustable to fit different seat heights.

Still another object of my invention is to provide a collapsible bed which may be set up in any convenient place entirely independent of an automobile.

A further object of my invention is to provide, in connection with a bed of this character, a mattress so constructed that it may be used as a wrapping or container for the folded frame-work of the bed and may be securely fastened to said frame-work when extended.

A still further object of my invention resides in the detail construction of the collapsible or folding frame-work of the bed, whereby the same may be quickly and easily folded and yet when extended will form a rigid and substantial supporting structure.

With these and other objects in view, the invention will now be described in detail, with reference to the accompanying drawings.

In these drawings:

Figure 1, is a plan view of the bed partially broken away with the mattress turned back to show the supporting structure;

Figure 2, is a side elevation thereof with a portion of an automobile shown in broken lines;

Figure 3 is an end elevation of the same;

Figure 4 is a detail view of a supporting leg, looking in the direction of the arrow 4, in Figure 3;

Figure 5 is a detail view of the same looking in the direction of the arrow 5, in Figure 2;

Figure 6 is a detail view of the elbow or toggle-joint used in all the diagonal leg braces;

Figure 7 is a cross sectional, detail view taken on the line 7—7, Figure 6;

Figure 8 is a detail plan view of the connection used in the transverse braces;

Figure 9 is a side elevation of the same;

Figure 10 is a detail plan view of the connection used in the longitudinal members;

Figure 11 is a side elevation of the same;

Figure 12 is a detail view, partly broken away, illustrating the method of bracing the foot and head or end members to the longitudinal members and locking the same together;

Figure 13 is a detail view showing the method of bringing the end members to the longitudinal members for locking thereto.

Corresponding and like parts are referred to in the following description and indicated in all views of the accompanying drawing by the same reference characters.

Let the numeral 15 represent one of the end bars of the bed and the numeral 16 the other. End bars 15 and 16 are connected with one another by a multiplicity of chains or other flexible devices 17. Springs 18, interposed between said flexible devices 17 and the end members 15 and 16 give resiliency to the bed. Flexible cross ties 53 are arranged between the chains 17 to keep them properly spaced. End bars 15 and 16 are braced against the tension of springs 18 by means of diagonal braces 19 pivoted thereon. Braces 19 are caused to project at a downward angle from end bars 15 and 16 by virtue of being pivoted upon the under side of depressions 20 formed in the end bars. The free extremities of braces 19 are shaped as shown in the Figure 12 having a tongue or projection 21 formed thereon adapted to engage in a slot 22 in the upper flanges of longitudinal bars 23 as indicated in Figure 12.

End bars 15 and 16 are held down to the longitudinal bars 23 by means of links 24. Links 24 are pivoted at their upper extremities to end bars 15 and 16, and carry, pivoted to their lower extremities, a second link 25 of relatively narrower width than links 24. The lower extremities of links 24 are narrowed as shown at 26, Figure 13, to conform to the width of the link 25. Slots 27 are formed in the ends of longitudinal bars 23 and at right angles to the axis thereof, these slots are of sufficient width to allow links 24 and 25 to pass therethrough at their overlapping or pivoted point. After the overlapping point has been passed through the slot, the elasticity of the links 24 forces the links 25 to one side and under one edge of the slots 27 as shown in Figure 12. Tongues 28 formed on sliding members 29 mounted on the links 24 are then forced into the slots 27 alongside of links 24 and prevent their becoming disengaged from said slots.

In forcing end bars 15 and 16 down to engagement with the longitudinal bars 23 it is necessary to work against the tension of the springs 18 and the compression of the brace 19. While doing this it was found difficult to engage the extremity of 26 of bar 24 in the slot 27 especially if the frame happened to be slightly out of alignment. This was the principal object in adding link 25, as its extremity could be placed in the slot 27 before the tension in the springs became great enough to make it difficult to handle, it would then act as a guide in directing link 24 into the slot 27, as shown in Figure 13.

Longitudinal bars 23 are each composed of two parts 30 and 31 overlapping each other and pivoted together by means of a pin 32. Another pin 33 carried in the extremity of part 31 passes through an opening in part 30 and serves to hold the two parts in alignment when extended. A pivoted clamp 34, carried by the part 30, is passed over the upper flanges of the parts 30 and 31 securely locking them together when the longitudinal bar 23 is in its extended position.

Pivoted to each part of the longitudinal bars 23 is a leg 35 formed of angle iron. Nested within this angle iron is an extendable leg 36 formed of relatively narrower material. The extendable leg 36 is slidably mounted within the leg 35 by means of guides 37, and has upon one of its flanges a plurality of obstructions or raised projections 38 adapted to be engaged by a pivoted clamp 39 at any point depending upon the lengths of leg desired. This allows the legs to be adjusted to fit into and upon the seats of an automobile.

The legs 35 are braced from and held perpendicular to the longitudinal bars by toggle arm braces 40, and are spaced from the legs of the opposite side and braced against side sway by transverse braces 41 and toggle arm braces 42.

The transverse braces 41, each consist of two parts. One extremity of each part is pivoted to one of the legs 35, and the opposite extremity of each part is narrowed and turned at right angles as shown at 43, and adapted to pass through an opening in its connecting part as indicated in Figure 8. One of the two connecting parts carries a pivoted clamp 44, which rigidly locks the two parts together after their terminals 43 have been placed in the openings in the connecting part.

Toggle arm braces 40 and 42 each consist of two portions 45 and 46, see Figure 6. One extremity of portion 45 is pivoted in portion 46 as shown at 47. The overlapping extremity of portion 46 is bifurcated as shown at 48 one side of bifurcation being relatively longer than the other. A stop 49, shown in section in Figure 7, is slidably mounted in a slot 50, formed in portion 45, so that it can be moved into the bifurcation in portion 46, securely locking the two portions in a parallel position, or out of the bifurcation thereby allowing the two portions 45 and 46 to fold upon each other. The stop 49 is always in a position to engage the longer side of the bifurcation 48 thereby stopping the two portions from folding past a parallel position.

Chains 17 and springs 18 support a mattress 51 which is constructed with crosswise extending ties so that it may be readily rolled into a roll whose length is equal to the width of the mattress. Mattress 51 is secured to the bed proper by means of fasteners, or harness snaps, 52, which are adapted to be snapped into the open end loops of the springs 18.

The operation for collapsing the bed for carrying is performed as follows; Mattress 51 is removed from the bed; sliding members 29 at one end of the bed are raised, and links 24 are forced outward, releasing them from slots 27, this releases the tension in the springs 18, braces 19 at that end of the bed are released from their slots 22 and are folded parallel with end bar 16 as are the links 24 and 25; end bar 16 is then rolled along the longitudinal bars 23, coiling the springs and chains around it as it progresses; when end bar 15 is reached it is released from the longitudinal bars, in a similar manner to that of end bar 16, and the whole bundle laid aside; the longitudinal bars at each side of the bed together with their attached legs and braces are released from each other, by raising the clamp 44 and disconnecting the two portions of the transverse braces 41; stops 49 of the toggle arms braces 42 are moved in their slots to allow braces 42 to fold, and the portions of transverse braces 41 are folded parallel with their respective legs; toggle arm braces 40 are then folded in a similar manner and the legs 35 are folded parallel to their respective parts of the longitudinal braces; clamps 34 on longitudinal braces 23 are now released and the two parts of said longitudinal braces are then folded together, parallel to one another. The bed now consists of four separate bundles. Two of the bundles are similar, each consisting of a folded longitudinal brace with its attached two legs, and portions of the transverse brace folded thereon; another consists of the two end bars, with their attached braces and links folded thereon, rolled in the springs and chains; and the fourth is the mattress itself. The first mentioned bundles are now placed upon the mattress and the whole rolled therein and strapped securely.

This forms a neat and compact roll that may be conveniently carried upon the running board of an automobile.

Having thus described my invention what I claim and desire to secure by Letters Patent is:—

1. The combination, in a bed of the class described, of end bars supporting a flexible spring structure, said end bars being detachably braced and locked to foldable longitudinal bars; means for locking said cross bars to said longitudinal bars consisting of links pivoted at their upper extremities to said end bars and adapted to pass at their lower extremities through openings in said longitudinal bars, obstructions on said lower extremities adapted to prevent their removal from said openings, tongues or wedges slidably mounted on said links adapted to bring said obstruction into action; legs pivotally fastened to and braced from said longitudinal bars and adapted to fold thereon; cross bars connecting and braced from the pairs of legs at each end of said bed, said cross bars adapted to be disconnected at their mid point and folded parallel to said legs.

2. The combination, in a bed of the class described, of end bars supporting a flexible spring structure, said end bars being detachably braced and locked to foldable longitudinal bars; said longitudinal bars being each formed in two sections, said sections being pivoted together and overlapping at their connection extremities, having a pin in the extremity of one overlapping portion adapted to engage an opening in the other overlapping portion to prevent horizontal movement at the pivotal point and a clamp pivoted to one overlapping portion adapted to engage the other overlapping portion and adapted to prevent vertical movement at the pivotal point, legs pivotally fastened to and braced from said longitudinal bars and adapted to fold thereon; cross bars connecting and braced from the pairs of legs at each end of said bed, said cross bars adapted to be disconnected at their mid point and folded parallel to said legs.

3. The combination, in a bed of the class described, of end bars supporting a flexible spring structure, said end bars being detachably braced and locked to foldable longitudinal bars; extendable legs pivotally fastened to and braced from said longitudinal bars and adapted to fold thereon; cross bars connecting and braced from the pairs of legs at each end of said bed, said cross bars consisting of two detachable connecting sections, each connecting section being pivoted at its outer extremity to one of said legs and having its inner extremity narrowed and turned at right angles to its length, and adapted to pass through an opening in its connecting section, an opening formed near said right angled turned portion adapted to receive a similar right angled turned portion formed on its connecting section, a clamp mounted on one of said sections and adapted to hold said right angled turned extremities within said openings, each connecting section being adapted to fold parallel to the leg to which it is pivotally connected.

4. The combination, in a bed of the class described, of end bars supporting a flexible spring structure, said end bars being detachably braced and locked to foldable longitudinal bars; extendable legs pivotally fastened to and braced from said longitudinal bars and adapted to fold thereon; cross bars connecting and braced from the pairs of legs at each end of said bed, said cross bars adapted to be disconnected at their mid point and folded parallel to said legs; means for bracing said legs from said cross arms consisting of braces having a toggle joint near their mid point dividing them into two parts, the extremity of one of said parts extending beyond said joint and overlapping its connecting part, a bifurcation formed in said extremity and adapted to receive a dog slidably mounted upon said connecting part, one side of said bifurcation being relatively longer than the other for engagement with said dog, to prevent said joined parts from being revolved beyond a position parallel with each other, the opposite side of said bifurcation being relatively shorter is adapted to engage said dog only when same has been moved into said bifurcation for the purpose of locking said parts in their extended or parallel position.

5. A bed of the class described consisting of head and foot bars, supporting a spring structure; longitudinal bars having legs pivoted thereto; jointed cross bars pivoted to said legs and braced therefrom; braces pivoted upon depressions formed in said head and foot bars at their one extremity and detachably connected to said longitudinal bars at their opposite extremity, said depressions formed so as to project the braces away from the plane of the bed and toward their connections to the longitudinal bars.

In testimony whereof I affix my signature.

FRANK M. STOLL.